(12) United States Patent
Mansour et al.

(10) Patent No.: US 10,853,671 B2
(45) Date of Patent: Dec. 1, 2020

(54) CONVOLUTIONAL NEURAL NETWORK SYSTEM FOR OBJECT DETECTION AND LANE DETECTION IN A MOTOR VEHICLE

(71) Applicant: Dura Operating, LLC, Auburn Hills, MI (US)

(72) Inventors: Iyad Faisal Ghazi Mansour, Auburn Hills, MI (US); Akhil Umat, Auburn Hills, MI (US); Kalash Jain, Bloomfield Hills, MI (US)

(*) Notice: Subject to any disclaimer, the term of this patent is extended or adjusted under 35 U.S.C. 154(b) by 84 days.

(21) Appl. No.: 16/294,342

(22) Filed: Mar. 6, 2019

(65) Prior Publication Data

US 2020/0285869 A1  Sep. 10, 2020

(51) Int. Cl.
*G06K 9/00* (2006.01)
*B60R 11/04* (2006.01)
*G06N 5/04* (2006.01)
*G06N 3/08* (2006.01)

(52) U.S. Cl.
CPC .......... *G06K 9/00805* (2013.01); *B60R 11/04* (2013.01); *G06K 9/00798* (2013.01); *G06N 3/08* (2013.01); *G06N 5/046* (2013.01)

(58) Field of Classification Search
CPC .. G06K 9/00805; G06K 9/00798; G06N 3/08; G06N 5/046; B60R 11/04
See application file for complete search history.

(56) References Cited

U.S. PATENT DOCUMENTS

| | | | | |
|---|---|---|---|---|
| 10,198,671 B1 * | 2/2019 | Yang | .................... | G06K 9/3233 |
| 10,503,172 B2 * | 12/2019 | England | ................ | G05D 1/0217 |
| 10,509,947 B1 * | 12/2019 | Douillard | .................. | G06T 3/00 |
| 10,706,452 B1 * | 7/2020 | Ghamsari | .......... | G06Q 30/0627 |
| 2010/0296700 A1 * | 11/2010 | Walter | .................... | G06K 9/036 382/103 |
| 2016/0104058 A1 * | 4/2016 | He | ........................... | G06K 9/66 382/156 |
| 2017/0169313 A1 * | 6/2017 | Choi | ..................... | G06K 9/4628 |
| 2017/0259801 A1 * | 9/2017 | Abou-Nasr | .......... | B60W 10/20 |

(Continued)

OTHER PUBLICATIONS

Tian et al., Lane Marking Detection via Deep Convolutional Neural Network, Nov. 2017, https://www.sciencedirect.com/science/article/pii/S0925231217317630 (Year: 2017).*

*Primary Examiner* — Ming Y Hon
(74) *Attorney, Agent, or Firm* — Vivacqua Crane PLLC

(57) ABSTRACT

A system and method for predicting object detection and lane detection for a motor vehicle includes a convolution neural network (CNN) that receives an input image and a lane line module. The CNN includes a set of convolution and pooling layers (CPL's) trained to detect objects and lane markings from the input image, the objects categorized into object classes and the lane markings categorized into lane marking classes to generate a number of feature maps, a fully connected layer that receives the feature maps, the fully connected layer generating multiple object bounding box predictions for each of the object classes and multiple lane bounding box predictions for each of the lane marking classes from the feature maps, and a non-maximum suppression layer generating a final object bounding box prediction for each of the object classes and generating multiple final lane bounding box predictions for each of the lane marking classes.

18 Claims, 4 Drawing Sheets

(56) References Cited

U.S. PATENT DOCUMENTS

| | | | |
|---|---|---|---|
| 2018/0211117 A1* | 7/2018 | Ratti | G06K 9/00785 |
| 2019/0163989 A1* | 5/2019 | Guo | G08G 1/167 |
| 2019/0228266 A1* | 7/2019 | Habibian | G06K 9/6262 |
| 2019/0278990 A1* | 9/2019 | Mansour | G06N 3/0454 |
| 2019/0384304 A1* | 12/2019 | Towal | G05D 1/0221 |
| 2020/0026282 A1* | 1/2020 | Choe | G06T 7/50 |
| 2020/0125861 A1* | 4/2020 | Sota | G06K 9/6212 |
| 2020/0210696 A1* | 7/2020 | Hou | G06K 9/00476 |

* cited by examiner

CONVOLUTIONAL NEURAL NETWORK SYSTEM FOR OBJECT DETECTION AND LANE DETECTION IN A MOTOR VEHICLE

FIELD

The present disclosure relates generally to a convolutional neural network (CNN) system for object detection and lane detection in a motor vehicle.

BACKGROUND

The statements in this section merely provide background information related to the present disclosure and may or may not constitute prior art.

Convolutional neural networks (CNNs) are used to solve problems in computer vision, including image classification, object detection, and object segmentation problems. A CNN may be comprised of one or more convolutional layers, typically including a subsampling step, followed by one or more fully connected layers similar to a standard multilayer neural network. The architecture of a CNN is designed to take advantage of the 2D structure of an input image including pixel images from a camera. This includes local connections and tied weights followed by some form of pooling which produce translation invariant features. The benefits of CNNs include that they are easy to train and have fewer parameters than fully connected networks with the same number of hidden units.

Conventional CNNs do not solve two or more independent problems at the same time. For example, known CNNs when applied to automobile vehicle assist and autonomous control systems cannot perform object detection including classification and localization, and road segmentation (lane detection) problems simultaneously. This requires the vehicle computer system to perform multiple parallel or independent computational steps, thereby requiring longer computational time and increased memory. Thus, there is a need in the art for a CNN system able to perform object detection including classification and localization, and lane detection problems simultaneously.

SUMMARY

A system and method for predicting object detection and lane detection for a motor vehicle is provided. The system includes a convolution neural network (CNN) that receives an input image and a lane line module. The CNN includes a set of convolution and pooling layers (CPL's) trained to detect objects and lane markings from the input image, the objects categorized into object classes and the lane markings categorized into lane marking classes to generate a number of feature maps, a fully connected layer that receives the feature maps, the fully connected layer generating multiple object bounding box predictions for each of the object classes and multiple lane bounding box predictions for each of the lane marking classes from the feature maps, and a non-maximum suppression layer receiving the multiple object bounding box predictions and the multiple lane bounding box predictions and generating a final object bounding box prediction for each of the object classes and generating multiple final lane bounding box predictions for each of the lane marking classes. The lane line module is configured to generate lane lines from the multiple final lane bounding box predictions.

In one aspect, the lane marking classes include a left lane marking class and a right lane marking class.

In another aspect, the multiple final lane bounding box predictions are centered on the lane markings.

In another aspect, the multiple final lane bounding box predictions each include a confidence value.

In another aspect, the multiple final lane bounding box predictions each include localization information that locate the multiple final lane prediction bounding boxes relative to the input image.

In another aspect, the CNN is configured as a single shot detector or a Fast-RCNN.

In another aspect, a camera mounted is to the motor vehicle, the camera capturing the input image.

In another aspect, the lane line module fits a second order polynomial through center points of the multiple final lane bounding box predictions.

In another aspect, the CNN is trained using multiple annotated input images having lane bounding boxes centered on left lane markings and lane bounding boxes centered on right lane markings.

In another aspect, each of the multiple lane bounding boxes are centered on a separate portion of the left lane markings and the right lane markings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
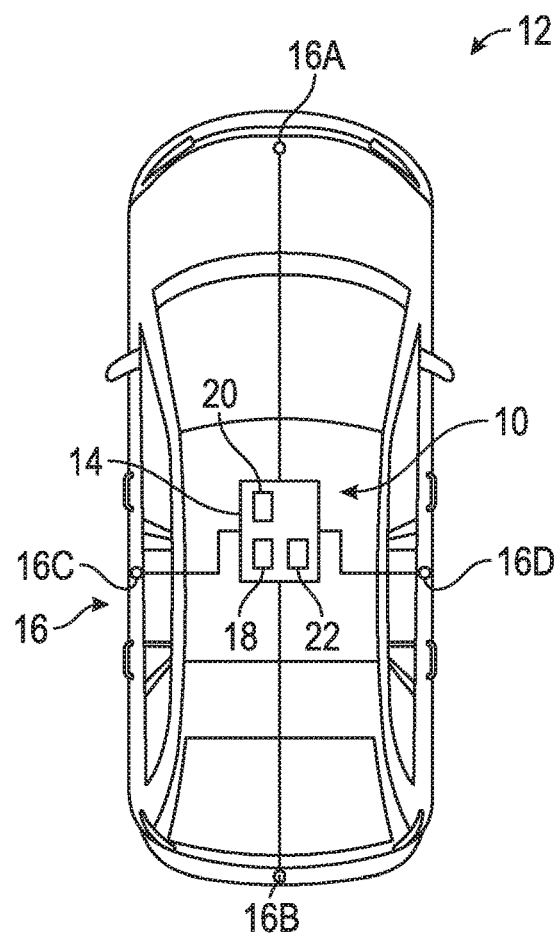
FIG. 1 is a schematic diagram of an exemplary motor vehicle having a convolutional neural network (CNN) system according to the principles of the present disclosure.

Referring to FIG. 1, a schematic diagram of a convolutional neural network (CNN) system 10 according to aspects of the present disclosure is shown with an exemplary motor vehicle 12. The motor vehicle 12 is illustrated as a passenger vehicle, however, the motor vehicle 12 may be a truck, sport utility vehicle, van, motor home, or any other type of vehicle without departing from the scope of the present disclosure. The CNN system 10 generally includes a controller 14 operable to run a CNN, as will be described below, and one or more sensors 16.

The controller 14 is a non-generalized, electronic control device having a preprogrammed digital computer or processor 18, memory or non-transitory computer readable medium 20 used to store data such as control logic, software applications, instructions, computer code, data, lookup tables, etc., and input/output ports 22. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. Thus, a non-transitory computer readable medium includes media where data can be permanently stored and media where data can be stored and later overwritten, such as a rewritable optical disc or an erasable memory device. Computer code includes any type of program code, including source code, object code, executable code, and a neural network. The processor 18 is configured to execute the code or instructions and the neural network. The controller 14 may be a dedicated control module or part of another control module on the motor vehicle 12, such as an advanced driver assist or autonomous driving control module, an engine control module, a body control module, etc.

The one or more sensors 16 are mounted along a periphery of the motor vehicle 12. In the example provided, the one or more sensors 16 include a front sensor 16A, a rear sensor 16B, a left sensor 16C, and a right sensor 16D. However, it should be appreciated that there may be any number of sensors 16 without departing from the scope of the disclosure. Each of the sensors 16A-D is operable to collect or sense information in a predefined area surrounding the motor vehicle 12. Information from the sensors 16A-D is communicated to the controller 14. In a preferred embodiment, the sensors 16A-D are cameras that collect images and/or video data. For example, the sensors 16A-D may be infra-red cameras, RGB cameras, dual (side-by-side) cameras, time-of-flight cameras, or log profile cameras.

Figure 2:
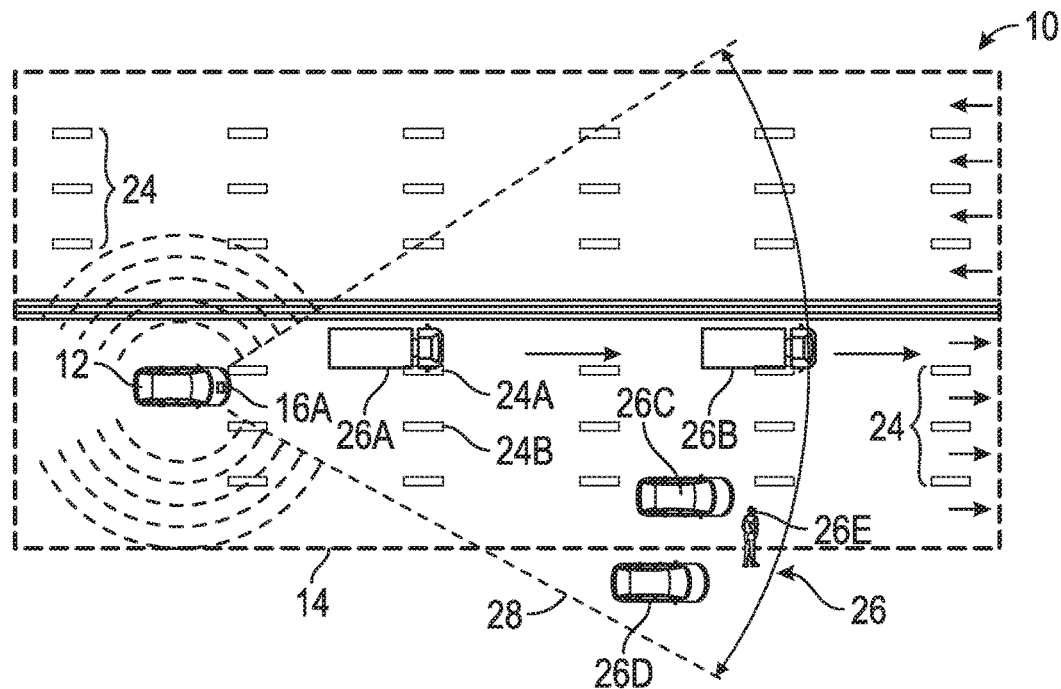
FIG. 2 is an exemplary diagram of the motor vehicle shown on a road with exemplary objects and lane markings.

With reference to FIG. 2, the motor vehicle 12 is illustrated on an exemplary a road or highway 24. It should be appreciated that the road 24 may be curved or straight and generally includes a left lane marking 24A and a right lane marking 24B and may include multiple additional lanes. The lane marking 24A, 24B may be dashed or solid or any other known lane marking configuration. In addition, various objects 26 may be located on or near the road 24. By way of example, the objects 26 may include a first vehicle 26A in an adjacent second lane but in front of the motor vehicle 12, a second vehicle 26B forward of the first vehicle 26A and partially blocked from direct view by the motor vehicle 12, a third vehicle 26C in an adjacent lane relative to the motor vehicle 12, a fourth vehicle 26D off to a side of the road 24, and a pedestrian 26E off to a side to the road 24. It should be appreciated that various other objects 26 may be detected by the motor vehicle 12 including fixed objects such as bridges, guard rails, trees, highway signs, etc.

The motor vehicle 12 captures input images from the sensors 16. For example, the front sensor 16A captures an input image in an arc 28 forward of the motor vehicle 12. For purposes of driver assistance or autonomous driving, any lane markings 24A, 24B and/or objects 26 viewable in the forward arc 28 are preferably detected and categorized by the CNN system 10, as will be described below.

Figure 3:
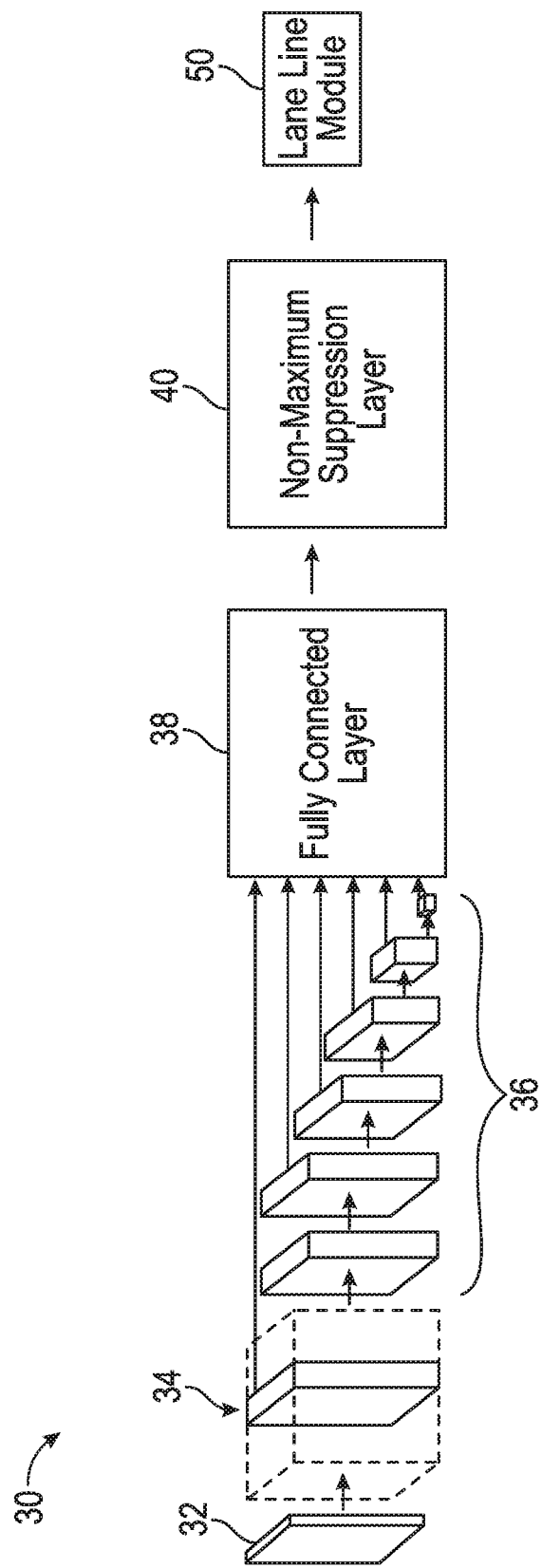
FIG. 3 is a diagrammatic presentation of the elements of a CNN of the present disclosure.

With reference to FIG. 3, a CNN 30 used to predict and classify lane markings 24A, 24B and objects 26 from an input image 32 is shown in a schematic diagram. The CNN 30 is executed by the controller 14. The CNN 30 is configured as a single shot detector in the example provided. However, the CNN 30 may be a You-Only-Look-Once (YOLO) network or a Fast-RCNN without departing from the scope of the present disclosure. The input image 32 is captured by the sensors 16 and communicated to the CNN 30. The CNN 30 is trained to predict the lane markings 24A, 24B and objects 26 from the input image 32.

Figure 4:
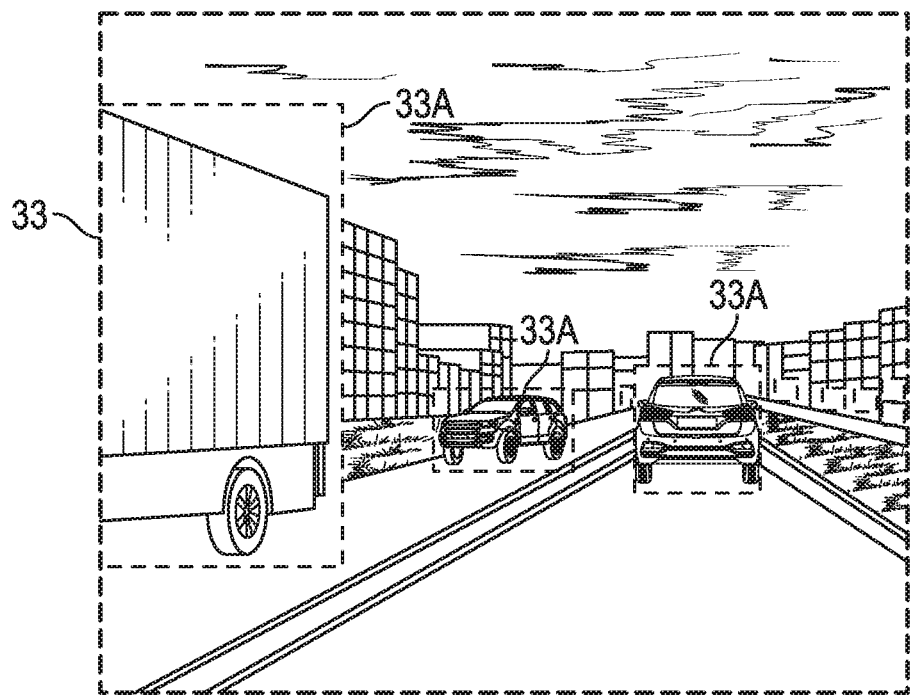
FIG. 4 is an example of an annotated input image of objects used to train the CNN of the present disclosure.
Figure 5:
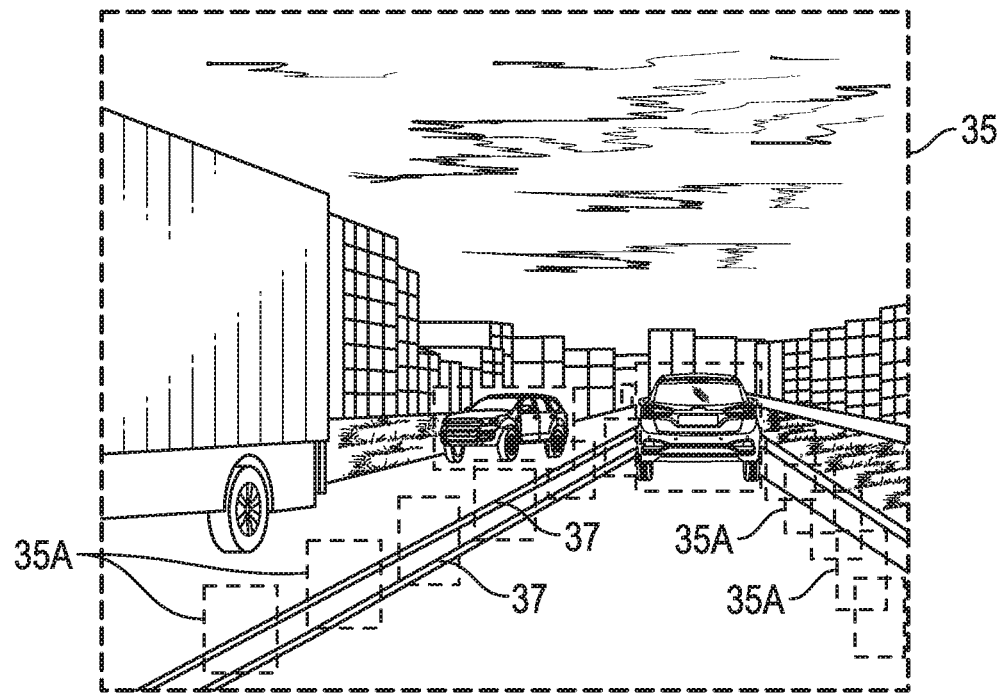
FIG. 5 is an example of an annotated input image of lane markings used to train the CNN of the present disclosure.

The CNN 30 is trained by providing annotated input images for each of object detection and lane marking detection. FIG. 4 illustrates an example of an annotated input image 33 annotated with object bounding boxes 33A. The object bounding boxes 33A bound certain classes of objects within the input image 33. FIG. 4 illustrates an example of an annotated input image 35 annotated with lane marking boxes 35A. Multiple lane marking boxes 35A are annotated for each of the lane markings 24A, 24B. The lane marking bounding boxes 35A are each centered on separate portions 37 of the lane markings 24A, 24B. Thus, the lane markings 24A, 24B form a line through the centers of the lane marking bounding boxes 35A. Multiple annotated input images, such as annotated input images 33 and 35, are processed by the CNN 30 to train the CNN 30 on object detection and lane line detection.

Returning to FIG. 3, the CNN 30 generally includes an input layer 34, a number of convolution and pooling layers (CPL's) 36, a fully connected layer 38, and a non-maximum suppression layer 40, each stacked together with each other. The input layer 34 loads the raw input data of the input image 32 that is to be processed by the CNN 30. The input image 32 is usually defined by the image width, height, and the number of channels per pixel. In Red/Green/Blue (RGB) input images, the number of channels is three to hold the individual RGB values.

The CPL's 36 each contain convolution layers and pooling layers. Convolution layers detect the presence of specific features or patterns in the original data by applying a convolution operation between a filter (the weights of the network which have been previously trained, as described above) and the input image 32. These features and patterns are given a confidence vote and used to identify objects 26 and lane markings 24A, 24B. The objects are categorized into object classes and the lane markings are categorized into lane marking classes to generate a number of feature maps. The lane marking classes include at least a left lane marking class and a right lane marking class. The first CPL's 36 learn to represent data in a very simple form such as horizontal and vertical lines and simple blobs of colors. The following CPL's 36 capture more complex shapes such as circles, rectangles, triangles, and the like. The subsequent layers of the CPL's 36 detect complex combinations of features from the previous layer or layers to form a more meaningful representation such as wheels, faces, grids, and the like. The output of the convolution and activation layer for a given filter is a feature map. The pooling layers represent the process of reducing the spatial size of the input image 32. Examples include max pooling and average pooling. For example, if a resolution of the input image to a pooling layer is 640×540, then the resolution of the output image or feature map is 320×270. The outputs, including feature maps, from the input layer 34 and each CPL 36 are communicated to the fully connected layer 38.

Figure 6:
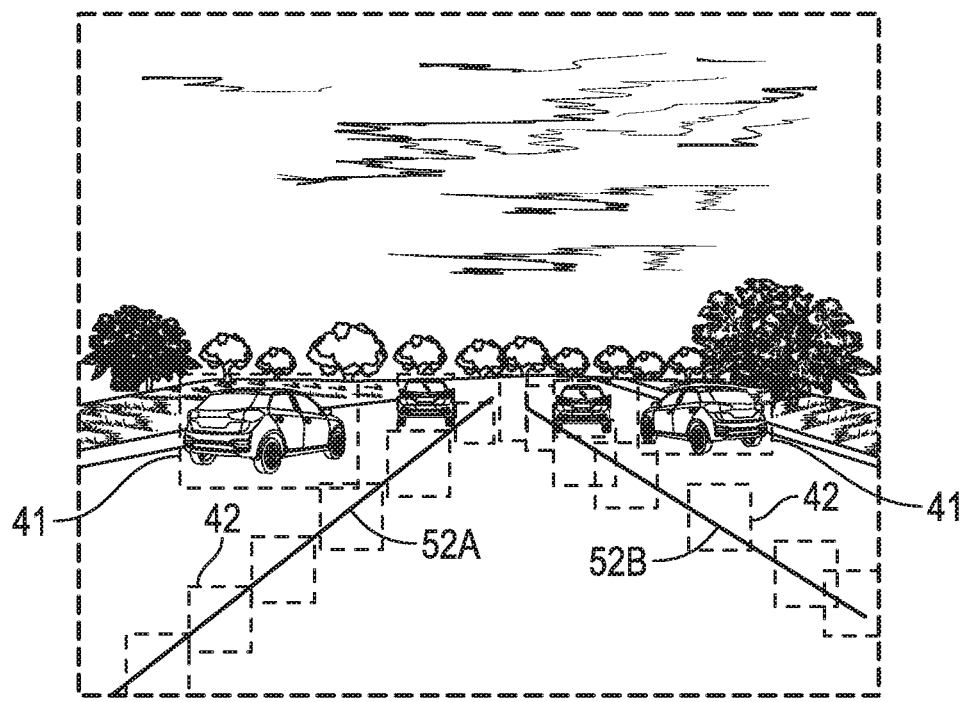
FIG. 6 is an example of output image of predicted objects and predicted lane markings generated by the CNN system of the present disclosure.

The fully connected layer 38 receives the filtered images, i.e. the feature maps, from the input layer 34 and the CPUs 38 and translates these into votes or confidence levels for each of the object classes and the lane marking classes. The confidence levels are associated with particular bounding boxes that bound a particular object class. Examples of bounding boxes are illustrated in FIG. 6. Generally, bounding boxes contain information, such as color, localization, class, etc., for whatever is within the bounding box. For object classes, an object bounding box prediction 41 bounds an identified object 26 and localizes the object 26 relative to the input image 32 and/or the motor vehicle 12. Based on the various feature maps provided to the fully connected layer 38, there are multiple object bounding box predictions 41 for each object class, each having a confidence level associated with strength of the prediction. For the lane marking classes, a lane bounding box prediction 42 is centered on a portion of a lane marking 24A, 24B, i.e. localizes the lane marking 24A, 24B relative to the input image 32 and/or the motor vehicle 12. The fully connected layer 38 generates multiple lane bounding box predictions 42 for each of the lane marking classes, each having a confidence level associated with strength of the prediction.

The non-maximum suppression layer 40 receives the multiple object bounding box predictions 41 and the multiple lane bounding box predictions 42 and generates a final object bounding box prediction for each of the object classes and generates multiple final lane prediction bounding boxes for each of the lane marking classes. The final object bounding box prediction has an aggregate high confidence value, for example of between 98% and 100%, that the object 26 within the final object bounding box is properly classified and localized. Likewise, the multiple final lane bounding box predictions have an aggregate high confidence value, for example of between 98% and 100%, that the lane markings 24A, 24B within the multiple final lane bounding box predictions are properly classified and localized. In addition, the multiple final lane bounding boxes are centered on different portions of the lane markings 24A, 24B. In the example provided, the multiple final lane bounding box predictions include six bounding boxes one each of the lane markings 24A, 24B.

Finally, the output of the CNN 30 is passed through a lane line module 50 that fits a predicted left lane line 52A and a predicted right lane line 52B to the multiple final lane line bounding boxes. In one example, the lane line module 50 fits a second order polynomial through center points of the multiple final lane bounding box predictions. Thus, the CNN system 10 provides object detection or prediction and lane line detection or prediction without requiring separate or multiple CNN's 30.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The following is claimed:

1. A system for predicting object detection and lane detection for a motor vehicle, the system comprising:
    a convolution neural network (CNN) receiving an input image, the CNN having:
        a set of convolution and pooling layers (CPL's) trained to detect objects and lane markings from the input image, the objects categorized into object classes and the lane markings categorized into lane marking classes to generate a number of feature maps;
        a fully connected layer that receives the feature maps, the fully connected layer generating multiple object bounding box predictions for each of the object classes and multiple lane bounding box predictions for each of the lane marking classes from the feature maps;
        a non-maximum suppression layer receiving the multiple object bounding box predictions and the multiple lane bounding box predictions and generating a final object bounding box prediction for each of the object classes and generating multiple final lane bounding box predictions for each of the lane marking classes; and
    a lane line module configured to generate lane lines from the multiple final lane bounding box predictions.

2. The system of claim 1, wherein the lane marking classes include a left lane marking class and a right lane marking class.

3. The system of claim 2, wherein the multiple final lane bounding box predictions are centered on the lane markings.

4. The system of claim 2, wherein the multiple final lane bounding box predictions each include a confidence value.

5. The system of claim 2, wherein the multiple final lane bounding box predictions each include localization information that locate the multiple final lane prediction bounding boxes relative to the input image.

6. The system of claim 1, wherein the CNN is configured as a single shot detector or a Fast-RCNN.

7. The system of claim 1, further comprising a camera mounted to the motor vehicle, the camera capturing the input image.

8. The system of claim 1, wherein the lane line module fits a second order polynomial through center points of the multiple final lane bounding box predictions.

9. The system of claim 1, wherein the CNN is trained using multiple annotated input images having lane bounding boxes centered on left lane markings and lane bounding boxes centered on right lane markings.

10. The system of claim 9, wherein each of the multiple lane bounding boxes are centered on a separate portion of the left lane markings and the right lane markings.

11. A system for predicting object detection and lane detection for a motor vehicle, the system comprising:
    a camera mounted to the motor vehicle, the camera capturing an input image having an object, a left lane marking, and a right lane marking;
    a convolution neural network (CNN) receiving the input image, the CNN having:
        a set of convolution and pooling layers (CPL's) trained to detect the object, the left lane marking, and the right lane marking from the input image, wherein the object is categorized into an object class, the left lane marking is categorized into a left lane marking class, and the right lane marking is categorized into a right lane marking class, the CPL's generating a number of feature maps;
        a fully connected layer that receives the feature maps, the fully connected layer generating multiple object bounding box predictions for each of the object classes and multiple lane bounding box predictions for the left lane marking class and the right lane marking class from the feature maps;
        a non-maximum suppression layer receiving the multiple object bounding box predictions and the multiple lane bounding box predictions and generating a final object bounding box prediction for the object class and generating multiple final lane bounding box predictions for each of the lane marking classes; and
    a lane line module configured to generate lane lines from the multiple final lane bounding box predictions.

12. The system of claim 11, wherein the multiple final lane bounding box predictions are centered on the lane markings.

13. The system of claim 12, wherein the multiple final lane bounding box predictions each include a confidence value.

14. The system of claim 12, wherein the multiple final lane bounding box predictions each include localization information that locate the multiple final lane prediction bounding boxes relative to the input image.

15. The system of claim 11, wherein the CNN is configured as a single shot detector or a Fast-RCNN.

16. The system of claim 11, wherein the lane line module fits a second order polynomial through center points of the multiple final lane bounding box predictions.

17. The system of claim 11, wherein the CNN is trained using multiple annotated input images having lane bounding boxes centered on left lane markings and lane bounding boxes centered on right lane markings.

18. The system of claim 17, wherein each of the multiple lane bounding boxes are centered on a separate portion of the left lane markings and the right lane markings.

\* \* \* \* \*